Sept. 6, 1960  H. L. ASP  2,951,721
COMPOSITE SEAL
Filed Feb. 23, 1956
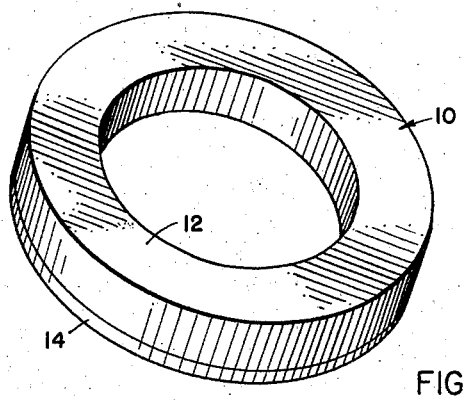
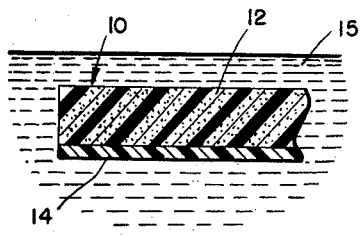
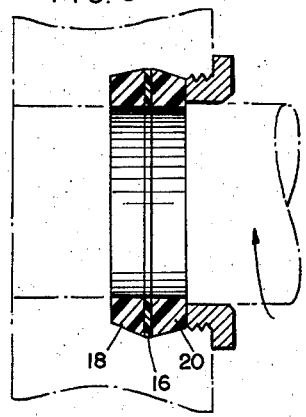
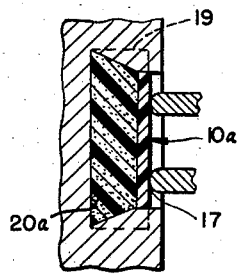
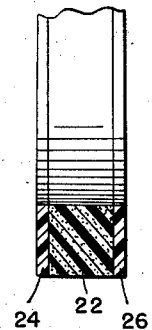
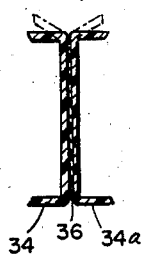
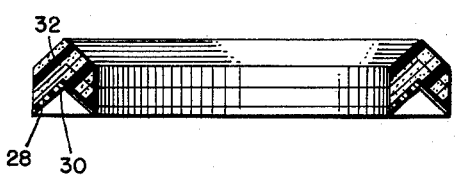
INVENTOR:
HOWARD L. ASP
BY
ATT'Y though this can United States Patent Office 2,951,721
Patented Sept. 6, 1960

2,951,721

COMPOSITE SEAL

Howard L. Asp, Evanston, Ill., assignor to Halogen Insulator and Seal Corporation, Franklin Park, Ill., a corporation of Illinois Filed Feb. 23, 1956, Ser. No. 567,108

14 Claims. (Cl. 288—16)

This invention relates to an article of manufacture and more particularly to an article such as a seal made of polytetrafluoroethylene-resin manufactured by E. I. du Pont de Nemours and Company and known commercially as Teflon.

Polytetrafluoroethylene exhibits distinct advantages when used in making seals in that it has an extremely low coefficient of friction and is not attacked by any substance under ordinary conditions. Although it can be changed chemically by molten alkalis and certain halogens at elevated temperatures these are not usually handled by seals.

Due to other peculiar characteristics, however, the use of polytetrafluoroethylene for shaft seals and the like has not been entirely satisfactory. Of these characteristics, the most objectionable have been its lack of elasticity, its low resiliency and the fact that it expands volumetrically about ten times that of the steel with which it works, its expansion being .001″ per inch per 18° F. increase in temperature.

A further difficulty is experienced when a seal is used with gases. A liquid film has to be maintained and very few liquids will "wet" Teflon; therefore liquids used that do not wet Teflon have to be trapped to be effective for final sealing purposes. Moreover, Teflon articles cannot be molecularly bonded together but separate at their interfaces under stresses to which they are normally subjected.

Although Teflon has a tendency to cold flow under pressure with an advantage that in doing so it fills tolerances at working temperatures, yet its recovery is negligible when shrinking under falling temperatures and objectionable leakage occurs. Springs driving followers have been resorted to, to force a sealing pressure at the marginal edges of the Teflon seal elements but these have been unsuccessful because of the concentration of pressure over a limited area of the Teflon seal and the fact that the seal is often subjected to rapid changes in temperature while the seal is subjected to the spring pressure. A result of such arrangements has been that the seal is permanently deformed and irregularly worn at the effective point of contact with the follower. Another disadvantage of articles made of Teflon is that it is difficult to maintain close tolerances with articles formed by known molding methods under present production conditions.

A primary object of the invention, therefore, is to fabricate a seal which is capable of effective sealing, both liquids and gases, when subjected to a wide range of temperatures, tolerances, and pressures.

A further object of the invention is to devise a method for making a seal which is characterized by a greater ability to return to a predetermined shape under working conditions.

A further object of the invention is to provide a method and article in which two separate units of independently fused Teflon can be bonded together against stresses that otherwise would fracture the Teflon itself.

Fig. 1 is a view in perspective of a seal made in accordance with the present invention;

Fig. 2 is a vertical sectional view of the seal of Fig. 1;

Fig. 2a is a vertical sectional view of an article embodying the invention when used as a valve disc;

Fig. 3 is an elevational sectional view of a modified form of the present invention;

Fig. 4 is an elevational sectional view of another further modified form of the present invention;

Fig. 5 is a vertical sectional view of still another modified form of the present invention; and Fig. 6 is a vertical sectional view of another modified form of the present invention in which parts are bonded together.

The invention contemplates a novel process of forming a Teflon article having novel and unusual characteristics. Two or more different layers of powders or powder mixtures containing Teflon and other materials such as a methyl methacrylate or vermiculite are superposed in a mold and compressed at 3500 pounds per square inch to form a unitary compacted member. Preferably one of the layers comprises pure Teflon powder and another one comprises a powder mixture which includes methyl methacrylate with Teflon powder. The compacted member is removed from the mold and heated to above 620° F. The methyl methacrylate is gasified leaving integrally fused Teflon molecules defining a layer of pure Teflon and a layer of porous Teflon. The porous layer is then impregnated with an elastomer or a lubricant, or with both. It is important in this connection that the interstices in the porous layers be intercommunicating for a reason hereafter set forth.

If desired, a dry lubricant such as vermiculite in powder form can be mixed with the Teflon powders before compaction. The dry lubricant is particularly desirable where a liquid lubricant would not wet the surface of the Teflon yet lubrication is necessary. With this method the number of laminate variations is unlimited. Various mixtures of Teflon and other materials can be laid in the compression mold in any order desired and to any thickness prescribed. Moreover, the articles before impregnation can be oriented with heat and pressure. The purpose of such orientation is to embody in the article a functional plastic memory when it is subjected to heat in service.

Although methyl methacrylate resin powders has been mentioned as mixed with powdered Teflon any suitable plastic such as acrylic resins or a methyl methacrylate resin may be used if it gasifies below 620° F. Moreover, the plastic is preferably comminuted to the same size as the Teflon particles, but it will be appreciated that the proportion of these ingredients and their relative size would, of course, be selected for the degree of porosity and the pore size desired. The larger the pores the greater the degree of flexure permitted in the porous Teflon as hereinafter described and the smaller the pores the firmer the article will be.

More particularly, as the temperature reaches the transition temperature of the additive (which is below 620° F.), the additive plastic gasifies, leaving a plurality of communicating interstices as the gas escapes. Then as 620° F. is reached, a transition begins to occur in the Teflon from the crystalline form to the amorphous form. Thereafter, because of the long chain structure of the fused polytetrafluoroethylene molecules, there resides in the article a reluctance to deformation, and, the porosity of intercommunicating interstices as compacted remains intact. The Teflon fuses, and, as it cools it shrinks to the ultimate size desired with the sponge portion integral with the solid portions of the article.

Although the Teflon where it is present in the article still has very little elasticity and still expands under increases in temperature about .001″ per inch per 18°

F. the thin walls of the porous portion will take wide mechanical flexure without injury. However, if these walls are heavy enough to have appreciable recovery, they resist such flexure and friction and abrasion will occur at a rate that is very little less than if the article were solid. On the other hand, if the solid portion is supported on sponge walls that are thin enough to reduce appreciably frictional wear, leakage still occurs due to a lack of sufficient strength.

In the present invention, the seal strength is supplied for adequate recovery of thin walled pores. The porosity is impregnated with lubricant or an elastomer, or both, the lubricant being used when friction and abrasion might occur and the elastomer when resilient strength is desired. Both are used where both conditions prevail.

When impregnating with an elastomer such as rubber, neoprene or a Thiokol rubber, the elastomer is thinned with suitable solvents, and the porous portion of the article is submerged therein. The article, while being submerged in the solution or just before, is subjected to vacuum to empty the air from the interstices of the porous portions. The article, while still submerged, is again subjected to atmospheric pressure to drive the elastomer into the interstices to fill them. Thereafter a vulcanizing temperature ranging from 180° F. for Thiokol rubber to 300° F. for neoprene is applied. If silicone rubber is impregnated, a water dispersion thereof is used and the temperature applied is approximately 500°.

The elastomer, when vulcanized, coats the Teflon walls with a resilient coating to a thickness and stiffness determined by the elastomer used. Preferably the elastomer should have substantial thickness but does not completely fill the pores. Its hardness should be of a grade selected to maintain the form or size of the article under work conditions to which it is to be subjected.

In those instances where the article is also impregnated with a fluid lubricant, the porous mass is evacuated while submerged in the lubricant at a temperature above that at which the lubricant flows. Preferably the lubricants found to be most desirable are those of a viscosity the same as light grease or vaseline. When the vacuum is removed, the article will become impregnated with lubricant.

In all of these instances mentioned, it is desirable to have the impregnations take place at as high a temperature as possible without damage to any of the materials present. Then as the Teflon molecules cool, they contract on the contents of the interstices. If an elastomer is present, such opposes this shrinkage as the temperature drops and becomes compressively stressed, thus providing a lot of so-called bounce for the article. Such an article exhibits approximately 60% greater recovery after removal of compressive loads than will solid Teflon. This unique property is advantageous in gaskets, valve discs and seat and packings where continued elasticity is necessary to provide sealing.

A further advantage has been found with elastomer impregnated articles of Teflon, separate articles of a size and shape capable of being economically compressed and fused separately can be joined together at their interfaces by vulcanization of elastomer adhesives to form complex integrated articles which cannot be compressed and fused as a single unit. Moreover, solid parts of Teflon with only a face of porous material can have imposed upon themselves shape memory conditions and then be welded to other parts having porous face material in which there is no shape memory imposed, or in which contrary shape memories have been imposed as described hereinafter.

Referring now to the drawings in further detail, Figs. 1 and 2 show an embodiment of the invention comprising a seal 10 for a rotating shaft (not shown). The seal comprises a solid Teflon portion 14 integrally formed with a porous section 12. By way of example, a layer of comminuted Teflon particles were placed in a mold, then a second layer was placed in the mold of Teflon particles mixed with a percentage of less than 25% by weight of methyl methacrylate. The two layers were compacted at a pressure of 3500 pounds per square inch. The compacted article was then removed and fused at a temperature above 620° F. The methyl methacrylate boiled off leaving the laminate porous with intercommunicating interstices and with all of the Teflon molecules intimately fused.

The seal as described is ready for use if desired with or without other seals of similar manufacture because the walls of the pores are comparatively thick. The recovery factor of the seal, though less than 30% of its deformation, provides an improved seal in combination with springs (not shown) pressing against the sponge portion with the working pressure received on the solid Teflon portion.

However, as shown in Fig. 2, preferably, the porous portion 12 is submerged in a liquid 15 of hot grease or a neoprene thinned with methylethylketone to a consistency slightly more viscous than water. As submerged, a vacuum of 10 inches of mercury is imposed. Air in the interstices bubbles out and the vacuum is released, whereupon the liquid 15 is drawn in to fill the interstices.

If the liquid is lubricant, the seal is permitted to cool and the grease thickens. The porous mass 12 contracts at the rate of .001″ per inch per 18° F. decrease in temperature and the lubricant absorbed is in excess of the space available to it. This assures adequate lubrication. Then when the seal is placed in a bearing or packing cavity of a machine which is slightly smaller than the seal, the lubricant maintains the seal at a temperature less than it would operate at if it were not lubricated. The seal running cooler, expands less and does not wear. Therefore, the life of the seal is greatly increased.

If the liquid 15 is a thinned neoprene, the seal, after impregnation, is brought to a temperature above 200° to vulcanize the neoprene, and thereafter when the seal cools, the neoprene is subjected to prestressing conditions as by the walls of the porous Teflon shrinking against the neoprene fill. This provides the porous Teflon with an initial resilience, similar to that present in a conventional golf ball with an improved recover from deformation well above 50% at room temperature.

It should be noted that the seal shown in Fig. 2 impregnated with neoprene could be a disc 10a instead of a ring and the sponge portion 12 thereof radially compressed at its margins from a normal form indicated by dotted lines 19 to the contour of the cavity 20a which constitute a dovetail recess. In this position, the solid Teflon is engaged by a valve land 17 or a bottle top, the seal being either used as a valve disc or a bottle closure gasket. In these instances, the disc 20a is resilient, and the presence of neoprene in the porous portion permits a yield of the valve face that is favorable to good closure seating. Moreover, the bottom of the cavity and the base of the porous portion can be adhered to each other with an epoxy resin which prevents pressure developing under the disc.

Also, with reference to the embodiment shown in Fig. 2, after being impregnated with neoprene and vulcanized, there is still room in the interstices for lubricant if lubricant in small quantities is desired. Moreover, if the elastomer impregnation is rubber, or has a rubber content, mineral spirits or other penetrating solvents can be used to fill the remaining spaces in the interstices and the rubber in turn will become spongy and swell and close off the interstices against contamination by fluids being controlled by the seal.

In Fig. 3 a shaft lubricating seal is shown wherein a solid layer 16 of Teflon is provided with porous layers 18 and 20 on opposite sides. The opposite layers can be impregnated with different materials, one with lubricant, the other with an elastomer. This is accomplished by laying the seal flat in a liquid no deeper than the thickness of the porous portion to be impregnated and drawing a vacuum to fill the interstices, then repeating with a different liquid or dispersion on the other side.

In Fig. 4, a porous portion is shown with portions of solid Teflon on opposite sides thereof with or without impregnation as above described.

In both Figs. 3 and 4, the respective portions of the article are deposited in a mold, compacted simultaneously to form a single compacted article that is then fused as already described.

In event it is desired that a seal have a "plastic memory" of a shape other than its final form, the seal shown in Fig. 1 has imposed on it the shape shown in Fig. 5. In doing this, the seal 10, once fused, is placed in a mold of the shape shown in Fig. 5 and under low pressure the seal is brought back to a temperature above 450°. The seal will then flow to the shape shown, in which shape it will remain when removed from the form in cooled condition. Thereafter, with this shape, the seal can be inserted in a cavity smaller than its overall size and when it is heated to a predetermined working temperature, it will progressively take on a new shape nearer its original shape in that degree which the proportional increase in the working temperature bears to said 450° F. Of course, if the working temperature is room temperature, the seal shown in Fig. 5 can be shrunk down by chilling to any temperature desired for its assembly with its cooperating parts.

Reference is now made to Fig. 6 where oppositely effective plastic memories are employed in a pump seal. Two comparative flat rings are formed, given memory and then adhered back to back. To do this, a layer of approximately 3/32" of pure Teflon particles is deposited in the mold, and a thin layer of mixed Teflon and methyl methacrylate particles is sprinkled over the pure Teflon particles around the central opening. In doing this, methyl methacrylate particles that have a distinct or contrasting coloring are used so that adequate thickness can be assured without excessive use of the mixture. The resulting mass is compacted at high pressures as already described and then fused with the methyl methacrylate gasifying and escaping. The ring is then permitted to cool. Thereafter the flat ring is placed between two molding members and brought to a temperature in excess of 450° F. to impose the shape on the member 34 that is shown in Fig. 6, with the sponge portion 36 thereof disposed on the convex or back side.

The other member 34a is made the same way and the two are ready for final assembly. The porous backs can either be buttered with an epoxy resin, or similar material, and placed back-to-back to air dry or be cured with heat; or they can be impregnated with rubber and vulcanized back-to-back in molds which preserve their imposed shape during the process. In either event, the two elements are intimately bonded together by an interface molecularly bonded material, the strength of which can be even greater than that of Teflon itself. A Teflon particle is thus formed with two oppositely effective memories which could not be otherwise provided.

I claim:
1. A shaft seal comprising an element of solid polytetrafluoroethylene having an element of porous polytetrafluoroethylene integrally formed therewith, said porous element having intercommunicating interstices containing a filler material under compressive stress.

2. A shaft seal comprising a ring of solid polytetrafluoroethylene having a ring of porous polytetrafluoroethylene integrally bonded thereto, said porous ring having intercommunicating interstices and being filled with vermiculite under compressive stress.

3. A shaft seal comprising an element of solid polytetrafluoroethylene having an element of porous polytetrafluoroethylene integrally bonded thereto, said porous element having intercommunicating interstices and containing neoprene under compressive stress.

4. A shaft seal comprising a ring of solid polytetrafluoroethylene having a ring of porous polytetrafluoroethylene integrally bonded thereto, said porous ring having intercommunicating interstices and being impregnated with natural rubber latex under compressive stress.

5. A shaft seal comprising a ring of solid polytetrafluoroethylene having a ring of porous polytetrafluoroethylene integrally bonded thereto, said porous ring having intercommunicating interstices and being impregnated with silicone rubber under compressive stress.

6. A shaft seal comprising a ring of solid polytetrafluoroethylene having a ring of porous polytetrafluoroethylene integrally bonded thereto, said porous ring each having intercommunicating interstices and being impregnated with liquid lubricant under compressive stress.

7. A shaft seal comprising a plurality of elements of solid polytetrafluoroethylene having a plurality of elements of porous polytetrafluoroethylene integrally bonded thereto, said porous elements each having intercommunicating interstices and containing neoprene under compressive stress.

8. A shaft seal comprising a plurality of rings of solid polytetrafluoroethylene having a plurality of rings of porous polytetrafluoroethylene integrally bonded thereto, said porous rings each having intercommunicating interstices and being impregnated with natural rubber latex under compressive stress.

9. A shaft seal comprising a plurality of rings of solid polytetrafluoroethylene having a plurality of rings of porous polytetrafluoroethylene integrally bonded thereto, said porous rings each having intercommunicating interstices and being impregnated with silicone rubber under compressive stress.

10. A shaft seal comprising a plurality of rings of solid polytetrafluoroethylene having a plurality of rings of porous polytetrafluoroethylene integrally bonded thereto, said porous rings each having intercommunicating interstices and being impregnated with liquid lubricant under compressive stress.

11. A shaft seal comprising a ring of solid polytetrafluoroethylene having a ring of porous polytetrafluoroethylene integrally bonded thereto, said porous ring having intercommunicating interstices and being impregnated with a lubricant under compressive stress.

12. A sealing member comprising a nonporous layer of solid polytetrafluoroethylene and a porous layer of polytetrafluoroethylene having intercommunicating interstices and being integrally bonded to said nonporous layer, and a filler material contained within the intercommunicating interstices of said porous layer under compressive stress.

13. The structure of claim 12 in which said filler material comprises an elastomer.

14. The structure of claim 12 in which said filler material comprises a lubricant.

References Cited in the file of this patent
UNITED STATES PATENTS

| | | |
|---|---|---|
| 1,095,810 | Carlitz | May 5, 1914 |
| 1,705,445 | Gitterman | Mar. 12, 1929 |
| 2,459,720 | Poltorak | Jan. 18, 1949 |
| 2,485,691 | Borgese | Oct. 25, 1949 |
| 2,689,380 | Tait | Sept. 21, 1954 |
| 2,728,698 | Rudner | Dec. 27, 1955 |
| 2,833,686 | Sandt | May 6, 1958 |

OTHER REFERENCES

Publication on page 149 of Product Engineering, September 1952.